(12) United States Patent
Nakagawa et al.

(10) Patent No.: US 11,536,195 B2
(45) Date of Patent: Dec. 27, 2022

(54) ENGINE ROOM STRUCTURE FOR VEHICLE

(71) Applicant: MAZDA MOTOR CORPORATION, Hiroshima (JP)

(72) Inventors: Hiroyuki Nakagawa, Aki-gun (JP); Kazuki Yamauchi, Aki-gun (JP); Takafumi Sakai, Aki-gun (JP); Satoshi Kusumoto, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 142 days.

(21) Appl. No.: 17/161,547

(22) Filed: Jan. 28, 2021

(65) Prior Publication Data

US 2021/0277824 A1 Sep. 9, 2021

(30) Foreign Application Priority Data

Mar. 4, 2020 (JP) .............................. JP2020-036562

(51) Int. Cl.
*F02B 77/02* (2006.01)
*B60T 17/04* (2006.01)
*B60R 16/02* (2006.01)

(52) U.S. Cl.
CPC .......... *F02B 77/02* (2013.01); *B60R 16/0215* (2013.01); *B60T 17/04* (2013.01)

(58) Field of Classification Search
CPC ...... F02B 77/02; B60R 16/0215; B60T 17/04; B60T 17/046
See application file for complete search history.

(56) References Cited

U.S. PATENT DOCUMENTS

2019/0376449 A1\* 12/2019 Carrell .................... F02B 77/08

FOREIGN PATENT DOCUMENTS

JP H11229892 A 8/1999

\* cited by examiner

*Primary Examiner* — Jacob M Amick
*Assistant Examiner* — Charles J Brauch
(74) *Attorney, Agent, or Firm* — Studebaker & Brackett PC

(57) ABSTRACT

An engine room structure for a vehicle uses dividing portions of plural wall members forming a cover member, and can thereby easily form a through portion through which plural routing members are caused to pass by notch-shaped portions without forming a substantial through hole. An engine room structure for a vehicle, which includes a cover member covering an upper portion of an engine and in which a through portion is formed in the cover member, and plural routing members pass through the through portion. The cover member is divided into at least a first member and a second member, continuous notch-shaped portions are formed along a partial dividing line between the first member and the second member in either one of those, and the through portion for the plural routing members is formed with the notch-shaped portions of the one member and an end portion of the other member.

13 Claims, 15 Drawing Sheets

ENGINE ROOM STRUCTURE FOR VEHICLE

BACKGROUND

Technical Field

The present disclosure relates to an engine room structure for a vehicle which includes a cover member covering an upper portion of an engine and in which a through portion through which plural routing members are caused to pass is formed in the cover member.

Background Art

In related art, an engine room structure for a vehicle has been known which is provided with a cover member covering an engine provided in an engine room at least from side surfaces to an upper portion for the purpose of heat damage prevention and noise prevention, as described, for example, in Japanese Patent Laid-Open No. 11-229892. Although it is ideal that no opening is provided to the above-described cover member, plural routing members such as harnesses, hoses, or pipes have to be caused to pass through the cover member.

In this case, there is a concern that hot air and sound produced in the engine leak to an outer region of the cover member unless sealing between the routing member and an opening in the cover member is certainly performed. In consideration of this point, it is preferable that plural routing members be caused to pass through one opening. To do so, a comparatively large through hole through which plural routing members are caused to pass has to be formed in the cover member, but in this case, it becomes difficult to form the cover member.

SUMMARY

Accordingly, this disclosure provides an engine room structure for a vehicle that uses dividing portions of plural wall members forming a cover member and can thereby easily form a through portion through which plural routing members are caused to pass by notch-shaped portions without forming a substantial through hole.

This disclosure provides an engine room structure for a vehicle, which includes a cover member covering an upper portion of an engine and in which a through portion is formed in the cover member, plural routing members being caused to pass through the through portion, wherein the cover member is divided into at least a first member and a second member, continuous notch-shaped portions are formed along a partial dividing line between the first member and the second member in either one of the first member and the second member, and the through portion for the plural routing members is formed with the notch-shaped portions of the one member and an end portion of the other member.

The above-described routing members may be a harness to be connected with a battery and a brake hose to be connected with a booster of a brake. In the above configuration, the dividing line between the first member and the second member that form the cover member is used, and the through portion through which the plural routing members are caused to pass can thereby easily be formed by the notch-shaped portions without forming a substantial through hole.

In one aspect of this disclosure, the plural routing members are arranged side by side along a direction of the partial dividing line between the first member and the second member. In the above configuration, the notch-shaped portions can be formed to be shallow, and facilitation of formability of the cover member can be achieved.

In one aspect of this disclosure, a first sealing member is provided between dividing portions of the first member and the second member, the notch-shaped portions are formed in the first member, the plural routing members pass through a single hard member via respective grommets, the hard member is mounted on the through portion in the cover member via a second sealing member with respect to the notch-shaped portions of the first member, and the hard member is sealed in a portion of the dividing line via the first sealing member with respect to the second member. In the above configuration, because the first sealing member is used for both of sealing between the dividing portions of the first member and the second member and sealing for the portion of the dividing line in the hard member, reduction of sealing members can be intended.

In one aspect of this disclosure, flexibility of one routing member of the plural routing members is higher than flexibility of the other routing member, a side wall of the cover member is formed in either one of the first member and the second member, both of the routing members pass through the cover member while being spaced apart at different distances from the side wall of the cover member, and the routing member with higher flexibility is routed in a far position from the side wall. In the above configuration, interference with the side wall due to shaking proneness of the routing member with high flexibility can be inhibited, and occurrence of abnormal noise due to contact of the routing member with the side wall can be inhibited.

In one aspect of this disclosure, the one routing member is a harness to be connected with a battery, the other routing member is a brake hose to be connected with a booster of a brake, disposing positions of the battery and the booster are switched in a left-right direction between a right hand drive vehicle and a left hand drive vehicle, the hard member is common to the right hand drive vehicle and the left hand drive vehicle, and the harness and the brake hose pass through the same positions in the hard member in the right hand drive vehicle and the left hand drive vehicle.

In the above configuration, the common hard member can be used for both of the vehicles which are the right hand drive vehicle and the left hand drive vehicle, and the harness as the routing member with high flexibility can be inhibited from interfering with the side wall.

This disclosure provides effects in which dividing portions of plural wall members forming a cover member are used and a through portion through which plural routing members are caused to pass can thereby be easily formed by notch-shaped portions without forming a substantial through hole.

DETAILED DESCRIPTION

An easily formed through portion through which plural routing members are caused to pass by notch-shaped portions by using dividing portions of plural wall members forming a cover member without forming a substantial through hole is realized by a configuration of an engine room structure for a vehicle. The engine room structure includes a cover member covering an upper portion of an engine, in which a through portion through which plural routing members are caused to pass is formed in the cover member and in which the cover member is divided into at least a first member and a second member, continuous notch-shaped portions are formed along a partial dividing line between the first member and the second member in either one of those, and the through portion for the plural routing members is formed with the notch-shaped portions of the one member and an end portion of the other member.

Figure 1:
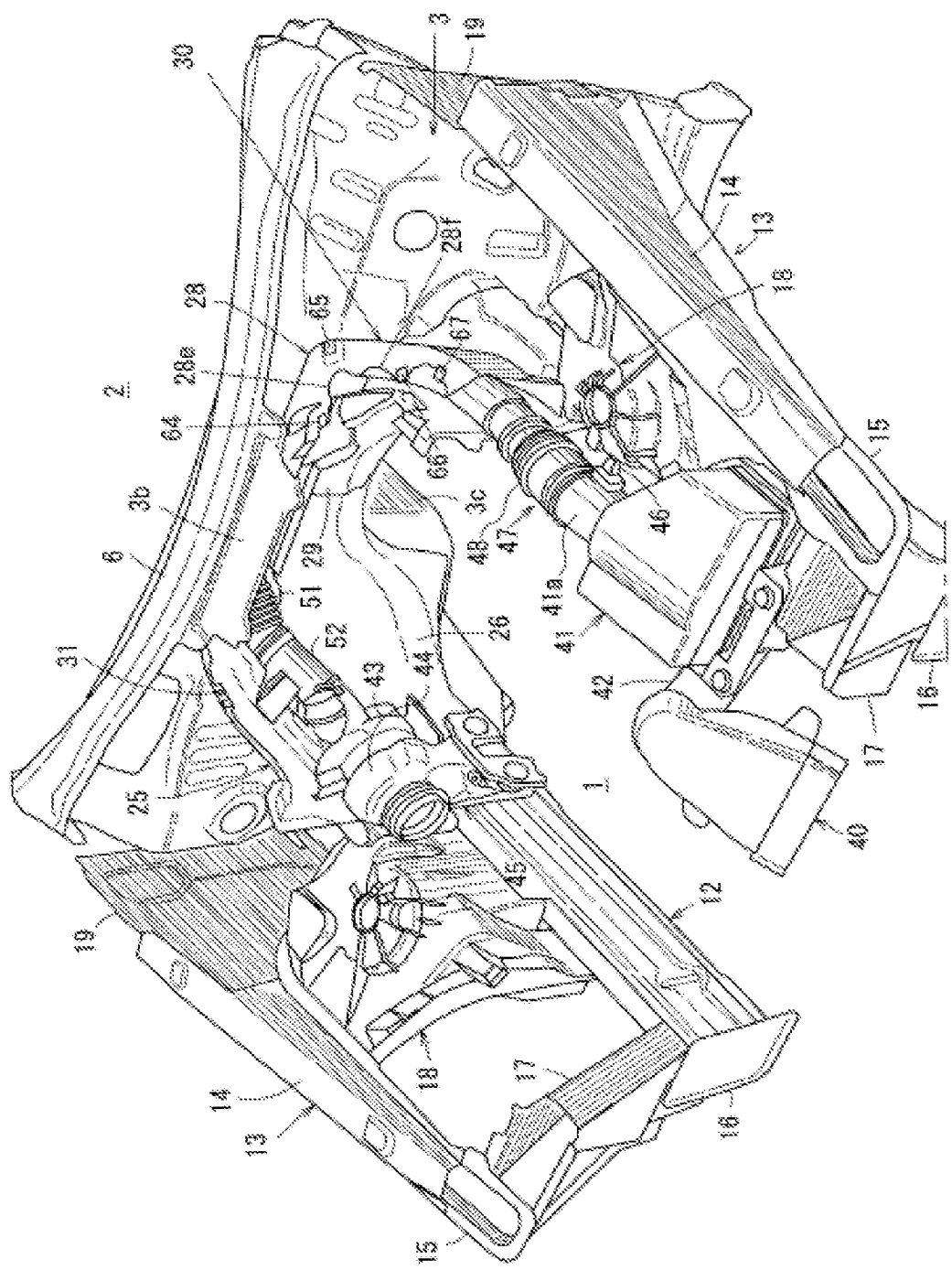
FIG. 1 is a perspective view illustrating an engine room structure for a vehicle of the present disclosure.

One embodiment of this disclosure will hereinafter be described in detail based on drawings. The drawings illustrate an engine room structure for a vehicle, and FIG. 1 is a perspective view illustrating the engine room structure for a vehicle. However, FIG. 1 illustrates the engine room structure in which a front-side upper wall, a rear-side upper wall, a front-side left wall, and a front-side right wall of cover members are removed.

Figure 2:
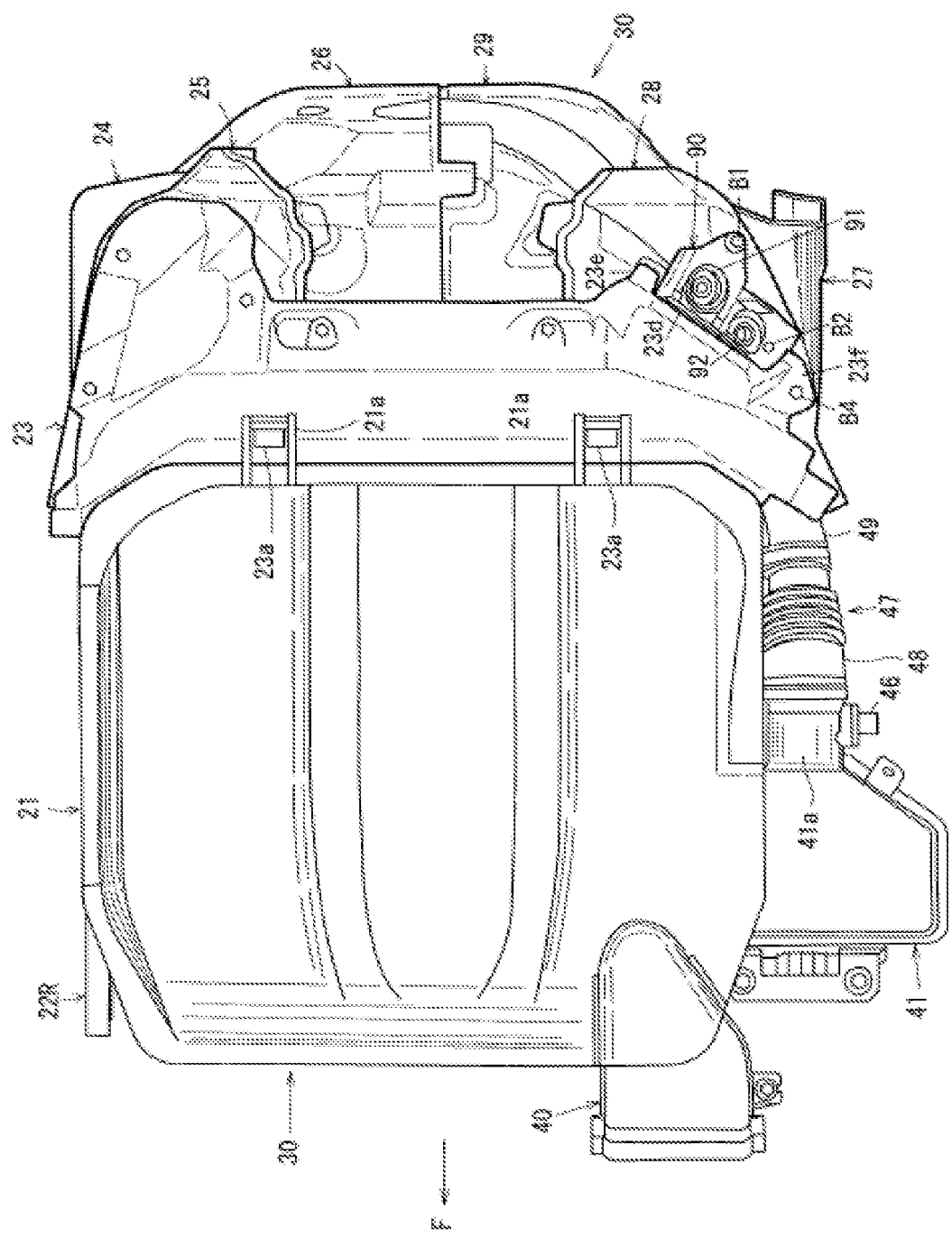
FIG. 2 is a plan view illustrating an intake pipe and a cover member.
Figure 3:
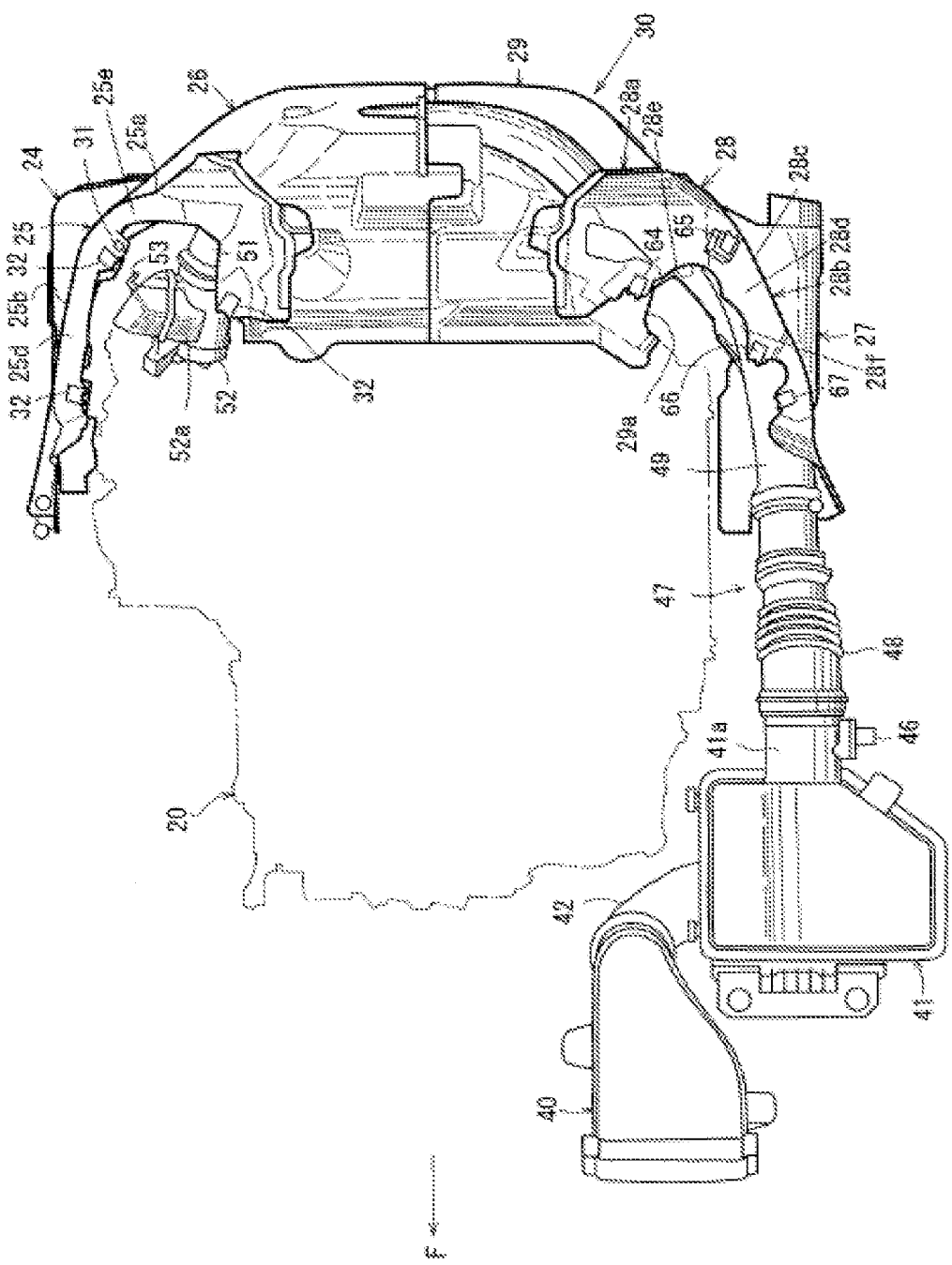
FIG. 3 is a plan view of the engine room structure, the plan view illustrating a state where a front-side upper wall, a rear-side upper wall, a front-side left wall, and a front-side right wall are removed.
Figure 4:
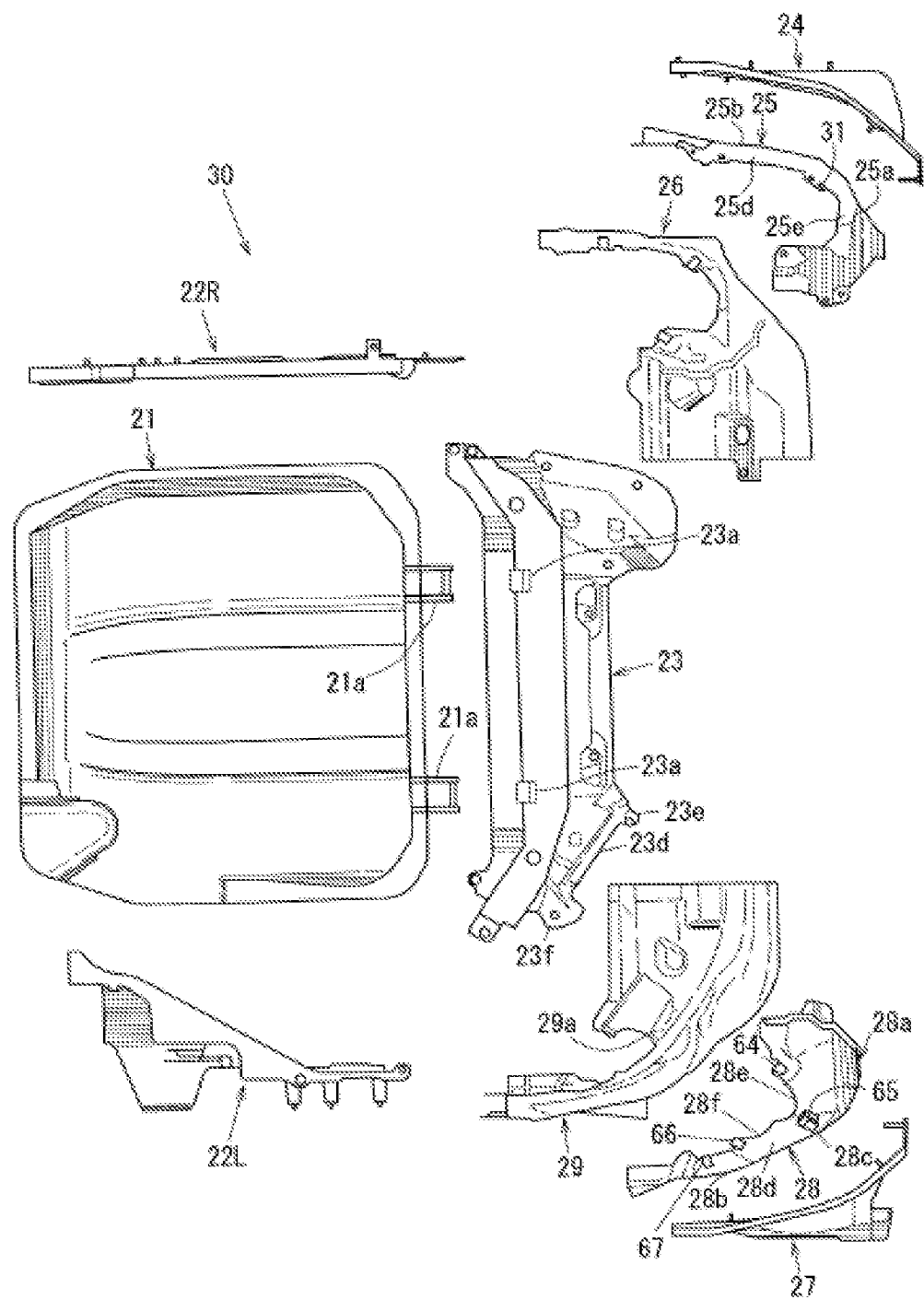
FIG. 4 is an exploded plan view of plural cover members.
Figure 5:
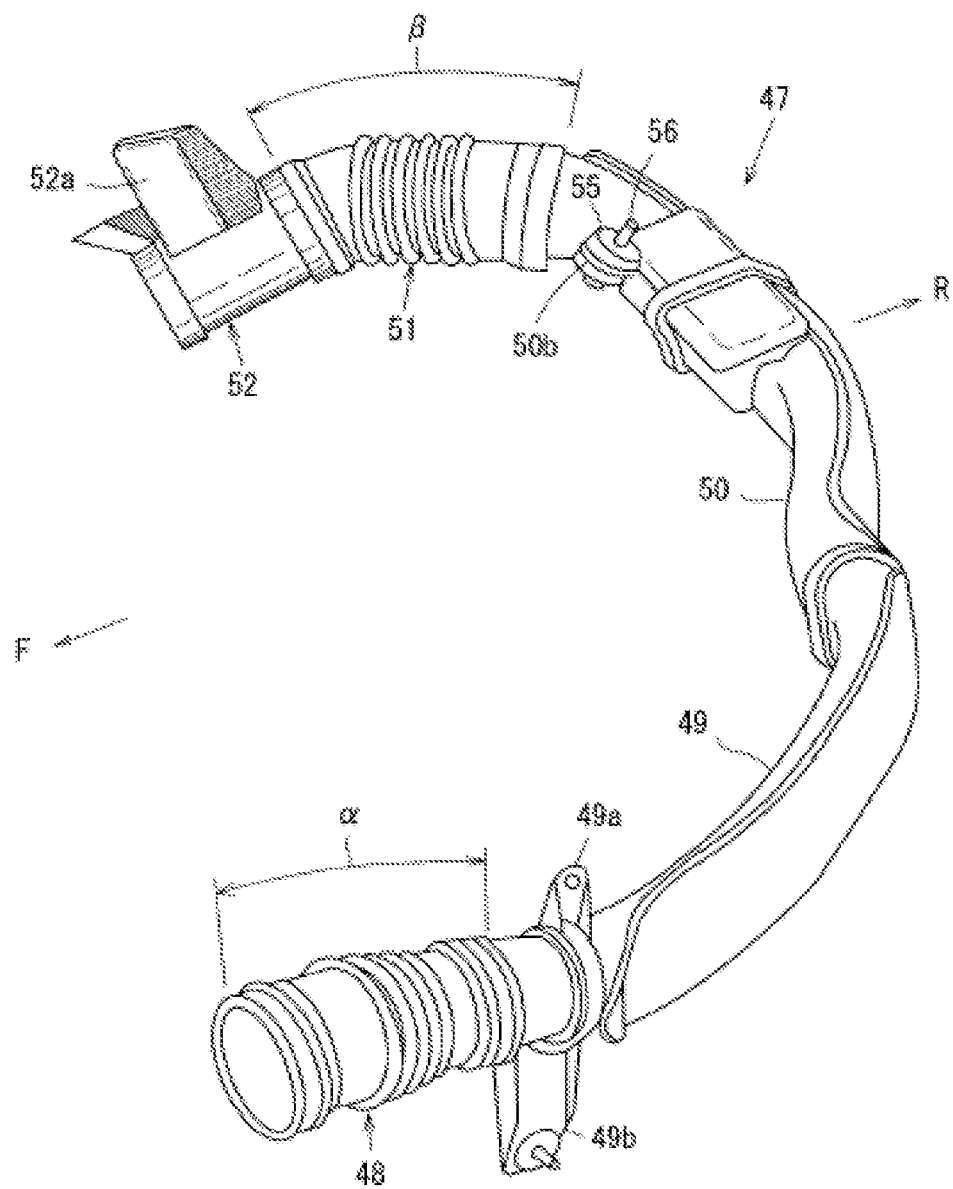
FIG. 5 is a perspective view of the intake pipe.
Figure 6:
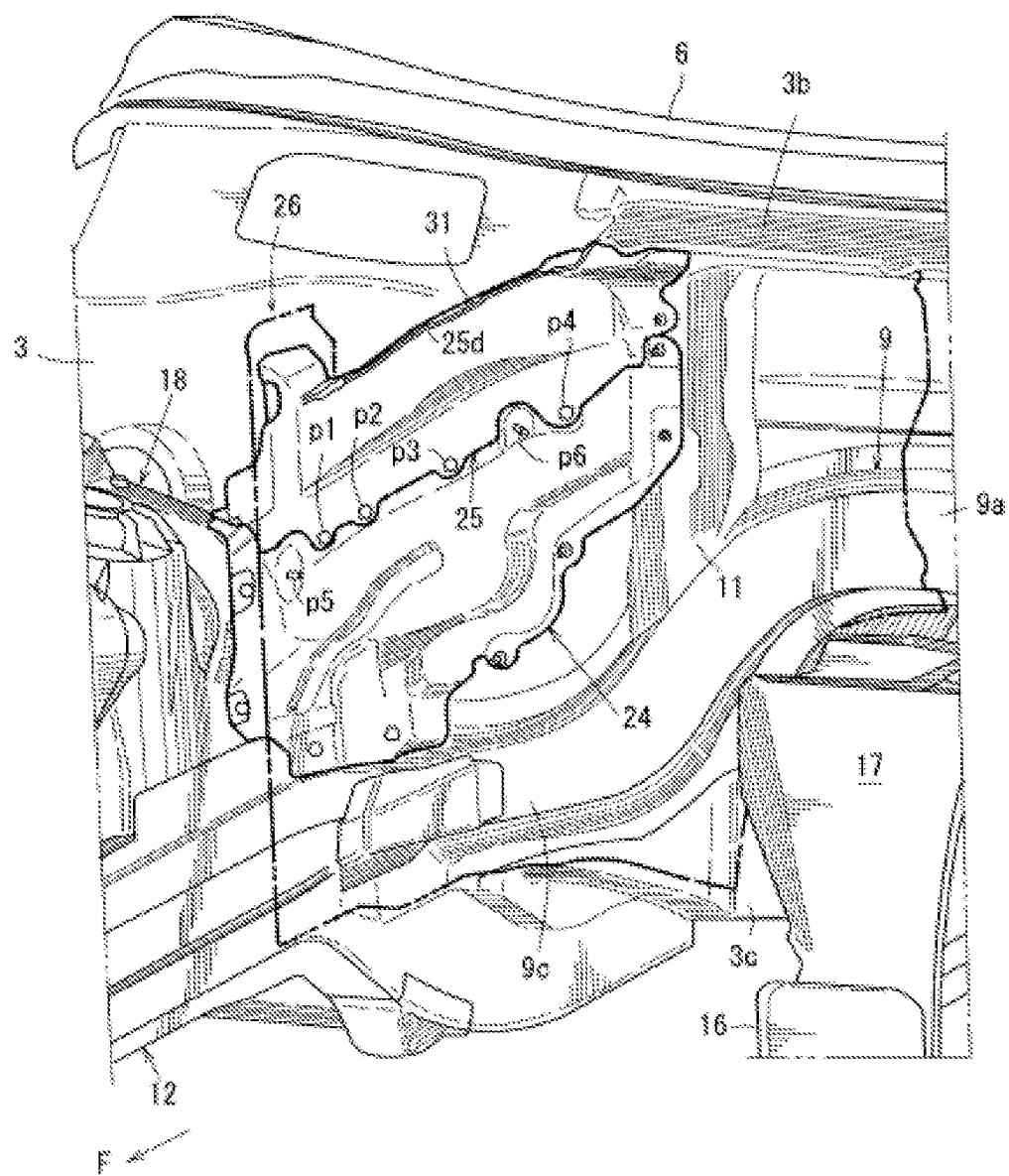
FIG. 6 is a perspective view illustrating a mounting structure of a rear-side right wall lower outer shell, a rear-side right wall upper outer shell, and a rear-side right wall insulator.
Figure 7:
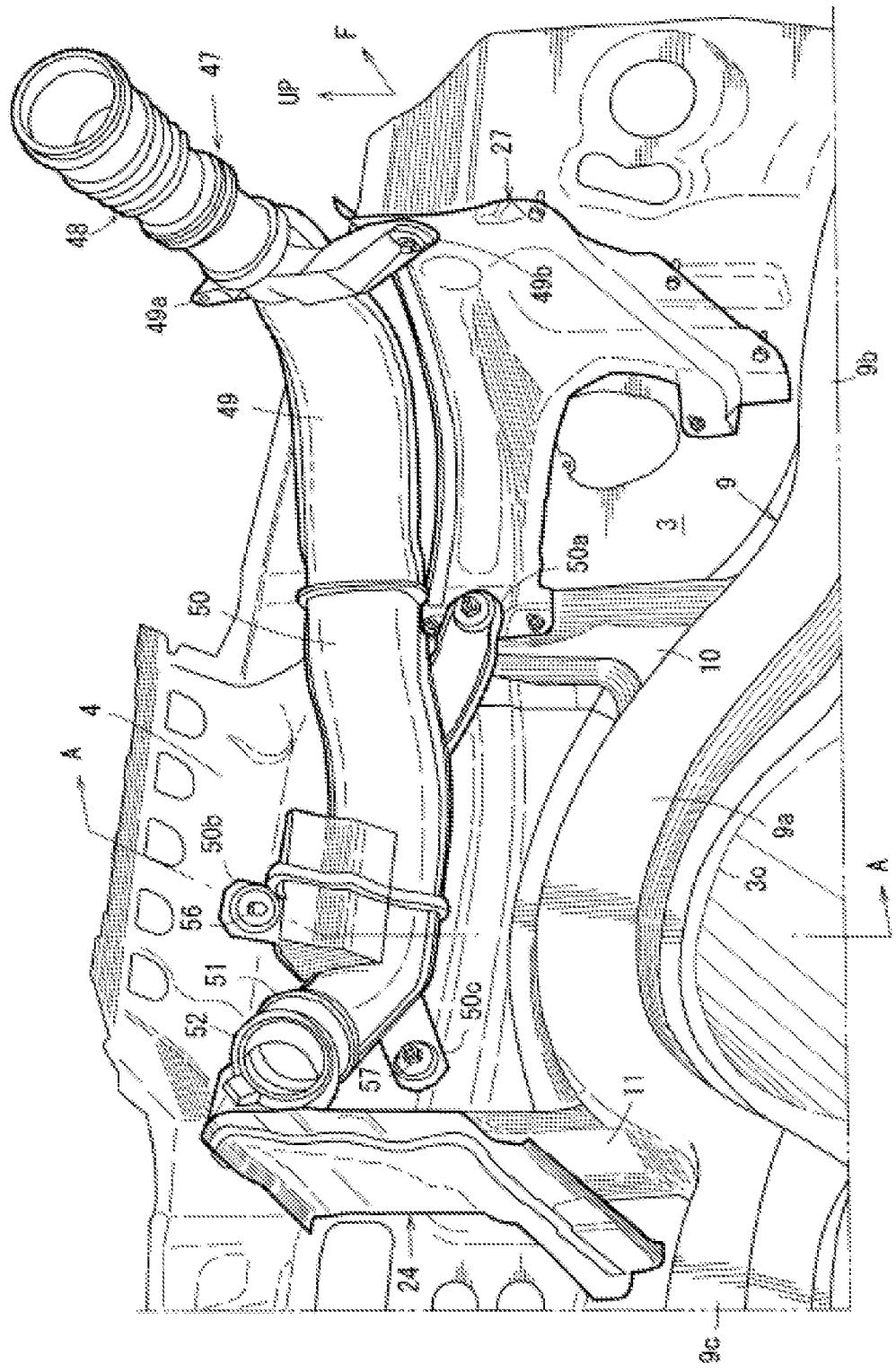
FIG. 7 is a perspective view illustrating a fixing structure of the intake pipe to a body.
Figure 8:
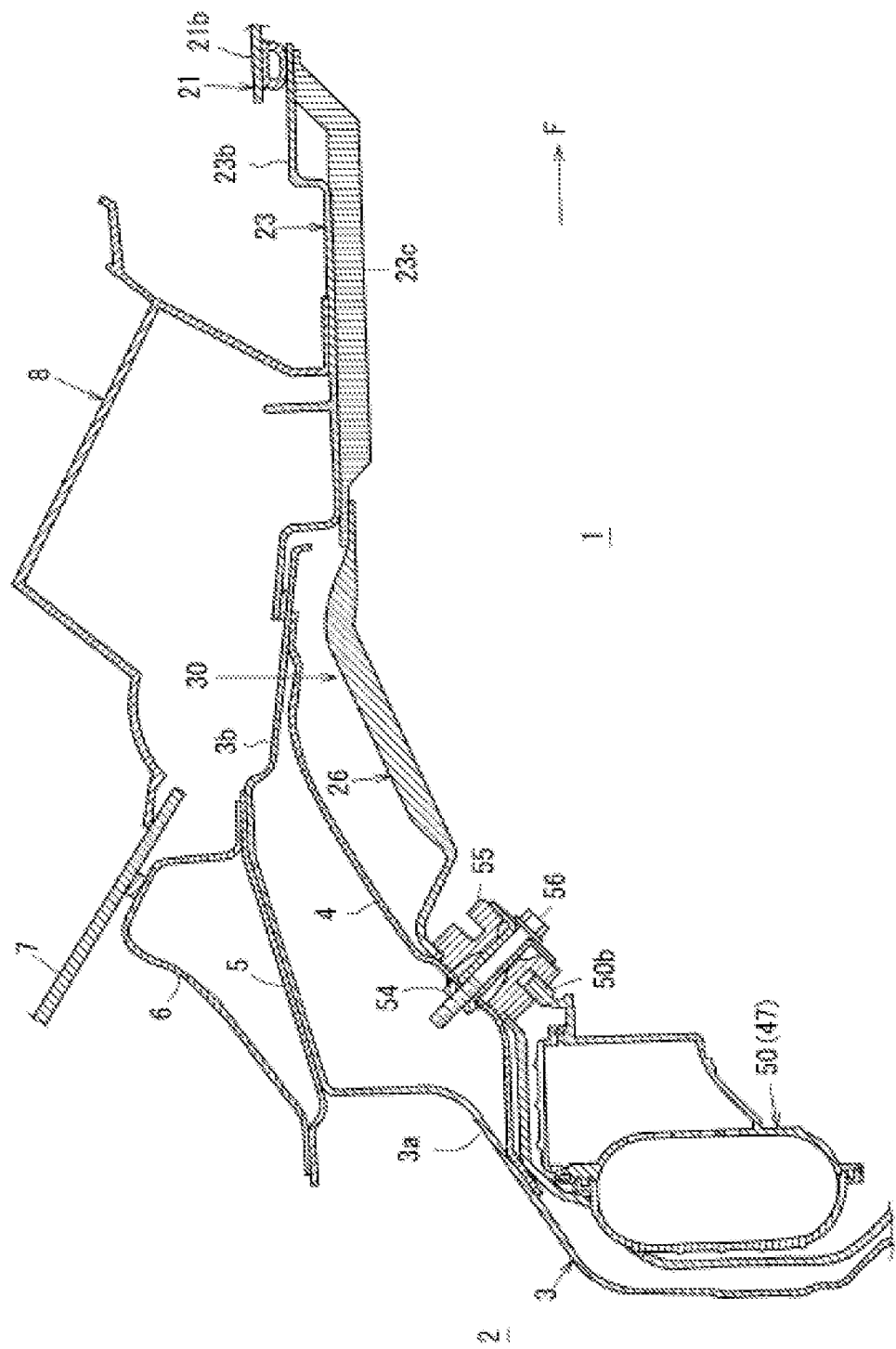
FIG. 8 is an arrow cross-sectional view taken along line A-A in FIG. 7.

FIG. 2 is a plan view illustrating an intake pipe and the cover member, FIG. 3 is a plan view illustrating the engine room structure in which the same cover members as FIG. 1 are removed, FIG. 4 is an exploded plan view of plural cover members, and FIG. 5 is a perspective view of the intake pipe. Further, FIG. 6 is a perspective view illustrating a mounting structure of a rear-side right wall lower outer shell, a rear-side right wall upper outer shell, and a rear-side right wall insulator. Furthermore, FIG. 7 is a perspective view illustrating a fixing structure of the intake pipe to a body, and FIG. 8 is an arrow cross-sectional view taken along line A-A in FIG. 7.

First, a front vehicle-body structure will be described with reference to FIG. 1 and FIG. 6 to FIG. 8. As illustrated in FIG. 8, a dash lower panel 3 is provided which partitions an engine room 1 and a vehicle cabin 2 in a vehicle front-rear direction. This dash lower panel 3 includes a panel body 3$a$ and a forward protrusion 3$b$ extending forward of the vehicle from an upper end of the panel body 3$a$.

A dash reinforcement 4 is provided which couples a front lower surface of the forward protrusion 3$b$ with an upper front surface of the panel body 3$a$ in an inclined manner in which a front is high and a rear is low, and a cowl panel 6 is mounted on an upper surface rear-half portion in the above-described forward protrusion 3$b$ of the dash lower panel 3 via a dash upper panel 5

The above-described cowl panel 6 supports an inclination lower end portion of front window glass 7. A cowl grille 8 is mounted between an inclination lower end upper surface of the above-described front window glass 7 and an intermediate portion of a rear-side upper wall 23 in a front-rear direction in a cover member 30 described later.

As illustrated in FIG. 6 and FIG. 7, an arch portion 9$a$ and a dash cross member 9 having left and right generally horizontal portions 9$b$ and 9$c$ are joined and fixed to a front surface of the dash lower panel 3 including a tunnel portion 3$c$, and a closed cross-section is formed between the dash cross member 9 and the dash lower panel 3.

As illustrated in FIG. 6 and FIG. 7, left and right reinforcement members 10 and 11 are provided which extend upward from an intermediate portion of the arch portion 9$a$ of the dash cross member 9 along the front surface of the dash lower panel 3, and closed cross-sections are formed between those reinforcement members 10 and 11 and the dash lower panel 3.

Meanwhile, as illustrated in FIG. 1, a pair of left and right front side frames 12 and 12 are provided which extend forward of the vehicle from left and right of a lower portion of the dash lower panel 3 through both of left and right sides of the engine room 1. The front side frame 12 is a vehicle body strengthening member that includes a closed cross-section extending in a vehicle front-rear direction by joining and fixing a front side frame inner and a front side frame outer together.

Further, in vehicle-width-direction outer regions and an upper region of the above-described front side frames 12, apron reinforcements 13 are provided which extend in the vehicle front-rear direction. The apron reinforcement 13 is a vehicle body strengthening member that includes a closed cross-section extending in the vehicle front-rear direction by joining and fixing an apron reinforcement upper 14 and an apron reinforcement lower 15 together.

While a set plate 16 for mounting a crash can is provided at a front end of the above-described front side frame 12, a shroud side 17 couples the front side frame 12 in an immediately rear portion of the set plate 16 with the above-described apron reinforcement lower 15 in an up-down direction.

Further, as illustrated in FIG. 1, a front suspension tower portion 18 is provided so as to couple, in the up-down direction, an intermediate portion of the apron reinforcement 13 in the front-rear direction with an intermediate portion of the front side frame 12 in the front-rear direction. Furthermore, as illustrated in FIG. 1, an apron panel 19 is provided between a rear portion of the apron reinforcement 13 and a hinge pillar not illustrated.

An upper portion of an engine 20 that is longitudinally arranged with a crankshaft being directed along the vehicle front-rear direction as illustrated in FIG. 3 is covered by the cover member 30 as illustrated in FIG. 2. In other words, the cover member 30 covers the upper portion of the engine 20. Here, "covering the upper portion of the engine" means that the engine is covered from an upper region to lateral sides close to an upper side.

Because this cover member 30 is configured with plural members, those plural members will be described with reference to FIG. 4.

On a front side, a front-side upper wall 21, a front-side right wall 22R, and a front-side left wall 22L are provided. At a center on a rear side, a rear-side upper wall 23 (second member) is provided. On a rear right side, a rear-side right wall lower outer shell 24, a rear-side right wall upper outer shell 25, and a rear-side right wall insulator 26 are provided.

On a rear left side, a rear-side left wall lower outer shell 27, a rear-side left wall upper outer shell 28 (first member), and a rear-side left wall insulator 29 are provided. The rear-side upper wall 23 is a fixing structure, and hinge arm pivotably supporting portions 23a and 23a are formed on left and right of a front portion of this rear-side upper wall 23.

The front-side upper wall 21 is an opening-closing structure, and hinge arms 21a and 21a are formed on left and right of a back end portion of this front-side upper wall 21. Moreover, the hinge arm 21a is pivotably supported by the above-described hinge arm pivotably supporting portion 23a, and the front-side upper wall 21 is configured to be capable of being opened and closed. Further, those front-side upper wall 21 and rear-side upper wall 23 cover an upper region of the engine 20.

As illustrated in FIG. 8, the front-side upper wall 21 is formed into a two-layer structure of an outer shell 21b and an insulator (not illustrated), and the rear-side upper wall 23 is similarly formed into a two-layer structure of an outer shell 23b and an insulator 23c. Both of the above-described front-side right wall 22R and front-side left wall 22L include outer shells and insulators, and those walls 22R and 22L cover right and left side regions of the engine 20.

Lower portions of those front-side right wall 22R and front-side left wall 22L are fixed to the front side frames 12, and the front-side right wall 22R and front-side left wall 22L are also fixed to a vehicle component (not illustrated) mounted on a vehicle body. Both of the above-described rear-side right wall lower outer shell 24 and rear-side left wall lower outer shell 27 are made of metal. As illustrated in FIG. 6 and FIG. 7, front portions, lower portions, and rear portions of those lower outer shells 24 and 27 are respectively coupled and fixed to tower housing rear portions of the front suspension tower portions 18, the front side frames 12, and the reinforcement members 10 and 11.

Here, the above-described rear-side right wall lower outer shell 24 is a member supporting the insulator 26 and the rear-side right wall upper outer shell 25. Further, the above-described rear-side left wall lower outer shell 27 is a member supporting the insulator 29, the rear-side left wall upper outer shell 28, and an intake pipe 47 described later.

In other words, each of the above-described outer shells 24, 25, 27, and 28 cannot support an intermediate portion in the up-down direction, and when all of those outer shells 24, 25, 27, and 28 are molded with a synthetic resin, it also becomes difficult to support the insulators 26 and 29. Thus, the outer shells 24 and 27 on the lower side are made of metal, and the outer shells 25 and 28 on the upper side are made of a resin. In particular, as illustrated in FIG. 6, on a vehicle right side, a configuration is made such that the outer shell 25 made of a resin on the upper side is supported at points p1 to p4 positioned in an upper periphery portion of the rear-side right wall lower outer shell 24 and the insulator 26 is also supported at other points p5 and p6 positioned in the upper periphery portion of the lower outer shell 24.

As illustrated in FIG. 6, a lower portion of the rear-side right wall upper outer shell 25 is fixed to the rear-side right wall lower outer shell 24 at the above points p1 to p4, and a rear portion thereof is fixed to the reinforcement member 11. Further, the rear-side left wall upper outer shell 28 is fixed to the rear-side left wall lower outer shell 27 and the reinforcement member 10.

As illustrated in FIG. 6, the above insulator 26 is fixed to the rear-side right wall lower outer shell 24 at the above points p5 and p6, a front portion of the insulator 26 is fixed to the tower housing rear portion and the front side frame 12, and a rear portion thereof is fixed to front region portions of the dash cross member 9 and of the tunnel portion 3c.

As illustrated in FIG. 3 and FIG. 4, in the above-described rear-side right wall upper outer shell 25, a rear periphery portion 25a extending in a vehicle width direction and a side periphery portion 25b extending in the vehicle front-rear direction are coupled together in a general L shape in a planar view. As illustrated in FIG. 3 and FIG. 4, the above side periphery portion 25b includes a raised wall and a folded portion 25d integrally folded inward in the vehicle width direction from an upper end of the raised wall, and a folded portion 25e continuous with the folded portion 25d is integrally formed with the rear periphery portion 25a.

In the above-described folded portion 25d, an engagement hole 31 as a locked portion is formed to open for engaging a locking portion (see locking claw 53) described later. Further, clip nuts 32 are provided to the above-described folded portions 25d and 25e for coupling with an upper end folded portion of the rear-side right wall insulator 26.

Next, an intake path will be described with reference to FIG. 1 to FIG. 3 and FIG. 5. A fresh air duct 40 and an air cleaner 41 are disposed in a front region on a left side of the engine 20, an air cleaner upstream pipe 42 connects a downstream end of the fresh air duct 40 and an upstream end of the air cleaner 41 together so as to cause those to communicate with each other. As illustrated in FIG. 1, an exhaust turbosupercharger 45 including a compressor 43 and a turbine 44 is disposed on a right side of the above engine 20. Meanwhile, an air flow meter 46 is mounted on a purified air outlet pipe 41a of the above-described air cleaner 41.

The intake pipe 47 connects the above-described purified air outlet pipe 41a of the air cleaner 41 and an intake inlet in the compressor 43 of the exhaust turbosupercharger 45 together so as to cause those to communicate with each other. As illustrated in FIG. 1, the intake pipe 47 is coupled with the compressor 43 of the exhaust turbosupercharger 45 disposed in a portion from one of left and right front sides of the engine 20 (the left front side in this embodiment) to the other side (the right side in this embodiment) of the engine 20 along a side wall of the cover member 30.

As illustrated in FIG. 5, the above-described intake pipe 47 includes a flexible hose member 48 on an upstream side (see a range α), an upstream pipe 49 made of a resin, a downstream pipe 50 made of a resin, a flexible hose member 51 on a downstream side (see a range β), and a joint pipe 52 connected with the compressor 43.

As illustrated in FIG. 3 and FIG. 5, the flexible hose member 48 on the upstream side connects the purified air outlet pipe 41a of the air cleaner 41 and the upstream pipe 49 together so as to cause those to communicate with each other, and an intermediate portion of the flexible hose member 48 is formed into a bellows shape and is configured to inhibit shaking due to engine vibration.

As illustrated in FIG. 5, the upstream pipe 49 connects a downstream portion of the flexible hose member 48 with an upstream portion of the downstream pipe 50 and is formed with a synthetic resin member of a two-division structure. The downstream pipe 50 connects a downstream portion of the upstream pipe 49 with an upstream portion of the flexible hose member 51 on the downstream side as illustrated in FIG. 5 and is formed with a synthetic resin member of a two-division structure as illustrated in FIG. 8.

As illustrated in FIG. 5, the flexible hose member 51 on the downstream side connects a downstream portion of the downstream pipe 50 with an upstream portion of the joint pipe 52, and an intermediate portion of the flexible hose member 51 is formed into a bellows shape and is configured to inhibit shaking due to engine vibration.

As illustrated in FIG. 1 and FIG. 5, the joint pipe 52 connects a downstream portion of the flexible hose member 51 on the downstream side with the intake inlet in the compressor 43 of the exhaust turbosupercharger 45, and this joint pipe 52 is formed of a hard resin. This joint pipe 52 configures a connection portion of the intake pipe 47 to the engine 20 side.

A protrusion 52a protruding outward is integrally formed with the above-described joint pipe 52 as illustrated in FIG. 3 and FIG. 5, and the locking claw 53 as the locking portion is integrally formed with an outer end surface of the protrusion 52a in the vehicle width direction as illustrated in FIG. 3. As illustrated in FIG. 3, this locking claw 53 is formed in a general L shape so as to be capable of engaging the engagement hole 31 from an upper region.

The above-described engagement hole 31 is positioned in a section above a normal position of the joint pipe 52 with respect to the rear-side right wall upper outer shell 25 configuring the cover member 30 and is configured that the above-described locking claw 53 is engaged with the engagement hole 31 and an area around the connection portion of the intake pipe 47 to the engine side is thereby temporarily placed in a higher position than the normal position. Here, both of the above-described locking claw 53 and engagement hole 31 are formed in the vicinity of a connecting portion of the joint pipe 52 with respect to the compressor 43.

As illustrated in FIG. 5 and FIG. 7, mounting seats 49a and 49b are integrally formed above and below an upstream portion of the upstream pipe 49. Further, mounting seats 50a, 50b, and 50c are integrally formed in a lower portion of an upstream portion of the downstream pipe 50 and above and below a downstream portion.

In FIG. 7, for convenience of illustration, although the insulators 26 and 29 are not illustrated, the mounting seats 50b and 50c of the intake pipe 47 are fixed to the dash lower panel 3 via the insulator 26, and the mounting seats 49b and 50a are fixed to the rear-side left wall lower outer shell 27 via the insulator 29.

That is, a portion on an upstream side of an area around the connection portion (see the joint pipe 52) of the intake pipe 47 to the engine 20 side is formed with the flexible hose member 51, and the upstream pipe 49 and downstream pipe 50 on an upstream side of the flexible hose member 51 are fixed to the body side.

As illustrated in FIG. 8, the above-described mounting seat 50b of the downstream pipe 50 is fixed to a weld nut 54 provided to the dash reinforcement 4 by using a bush 55 and a bolt 56. Further, the mounting seat 50c is fixed by screwing a nut 57 on a stud bolt provided to the dash lower panel 3.

Figure 9:
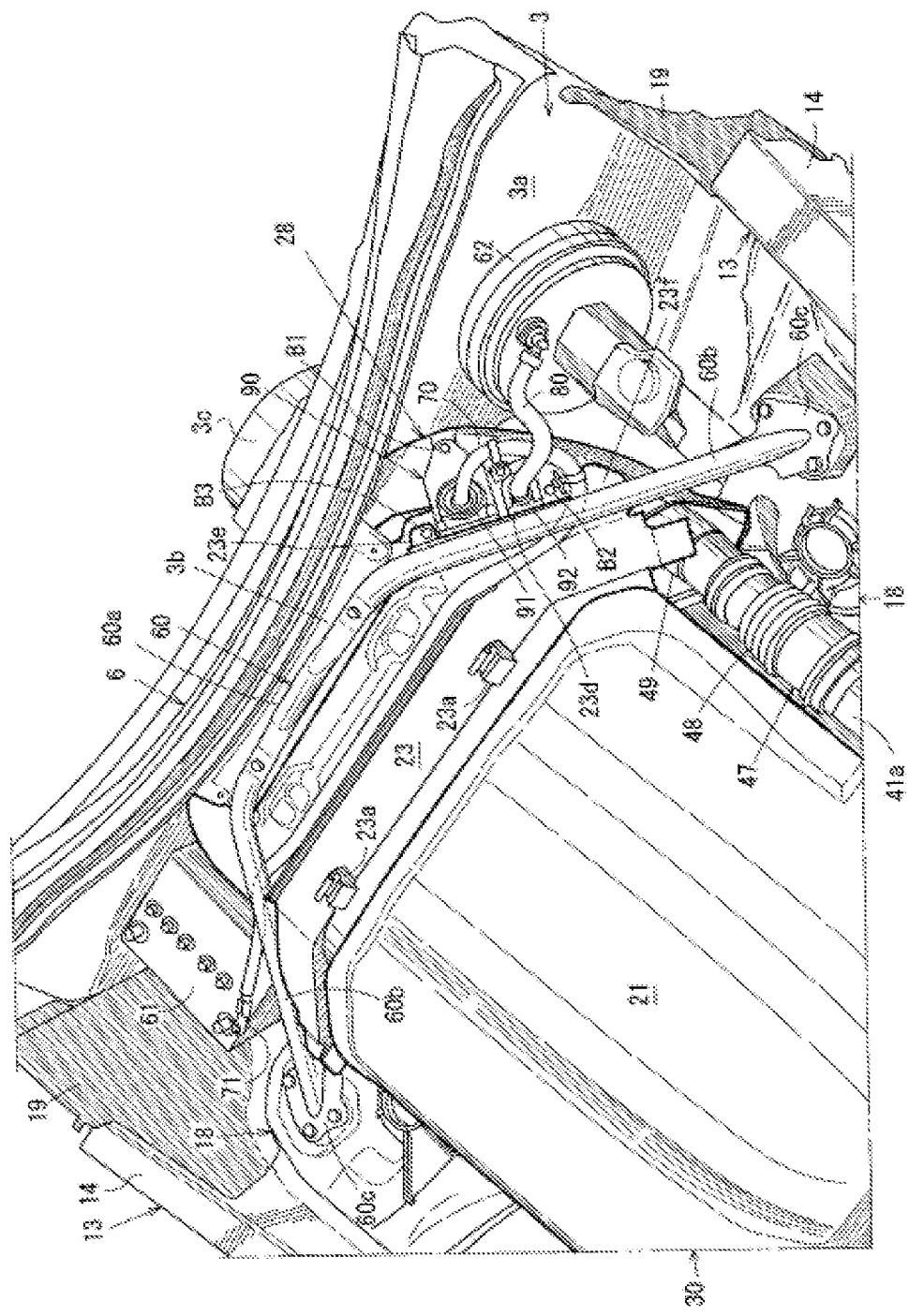
FIG. 9 is an upper region perspective view of principal components, the upper region perspective view illustrating the engine room structure for a vehicle in a left hand drive vehicle.
Figure 10:
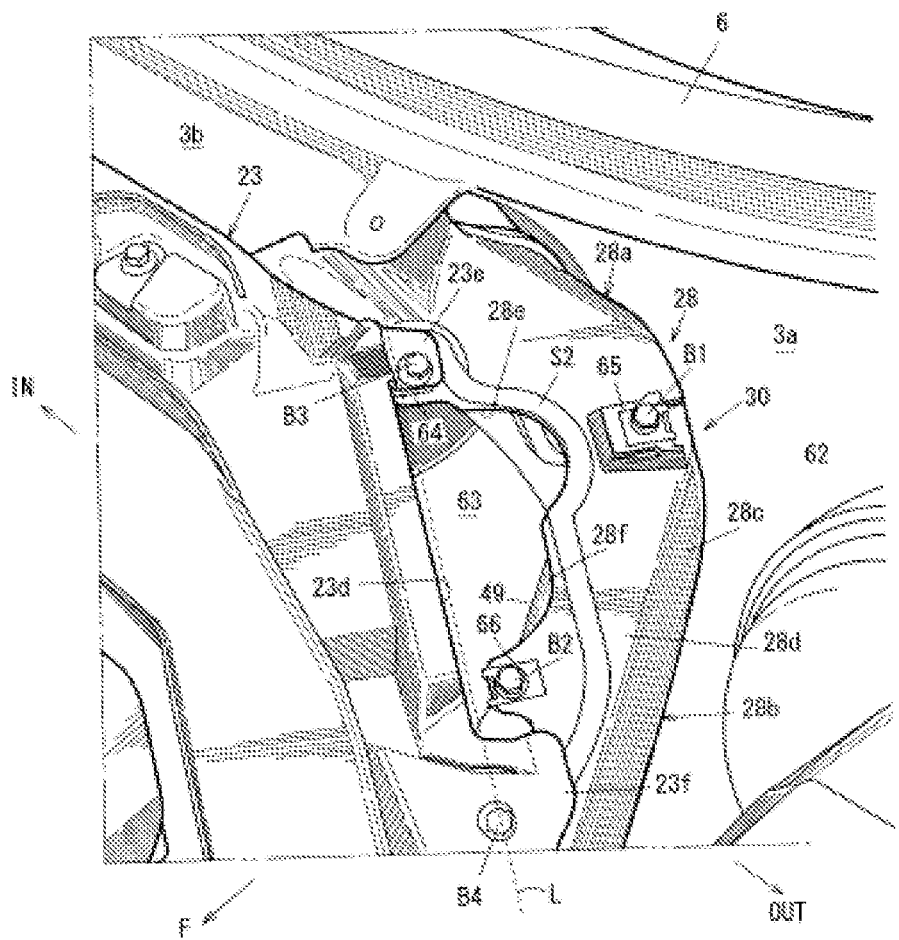
FIG. 10 is an upper region perspective view illustrating related structures among a side wall, an upper wall, and a second sealing member.
Figure 11:
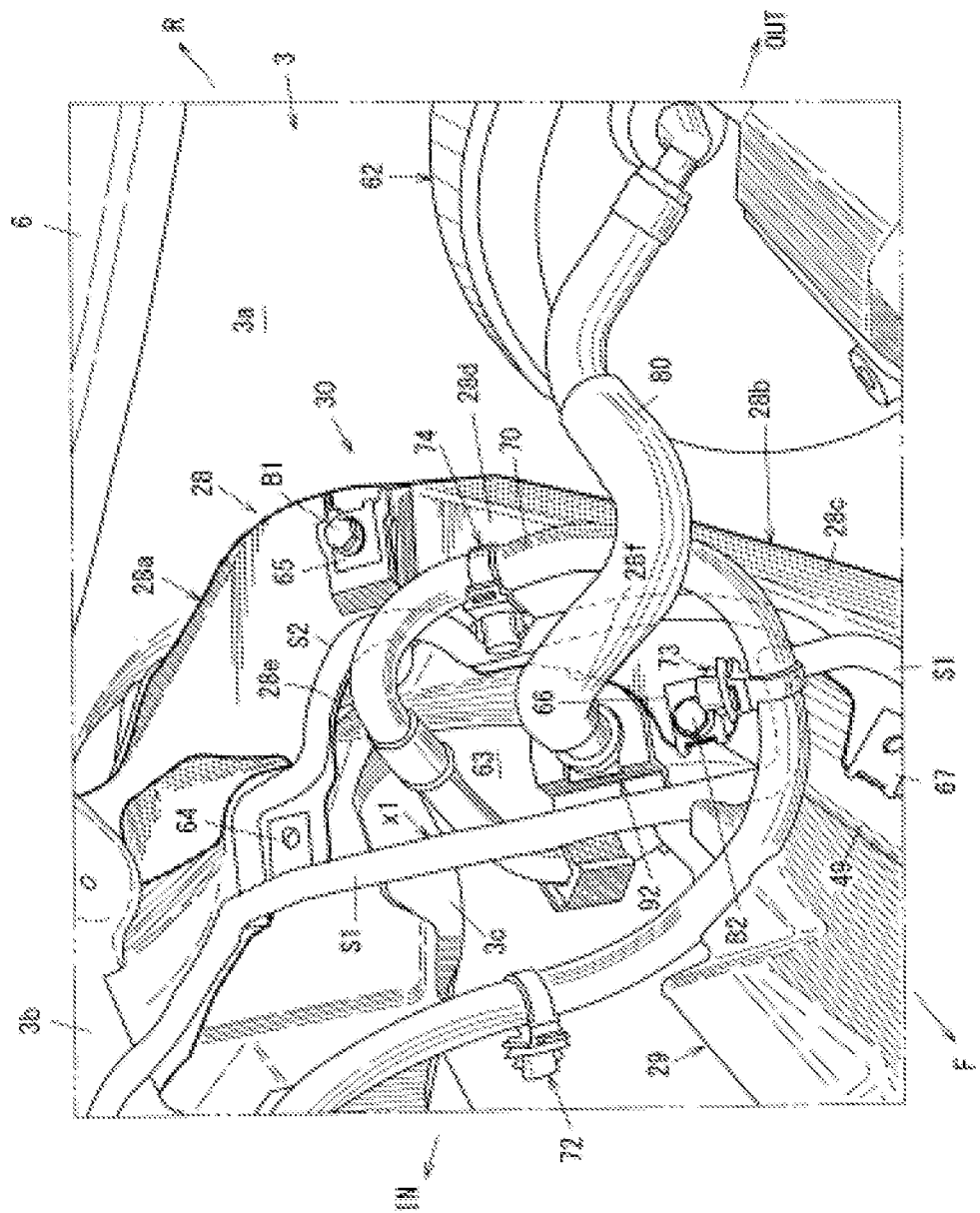
FIG. 11 is an upper region perspective view illustrating a through structure of routing members with respect to a through portion.
Figure 12:
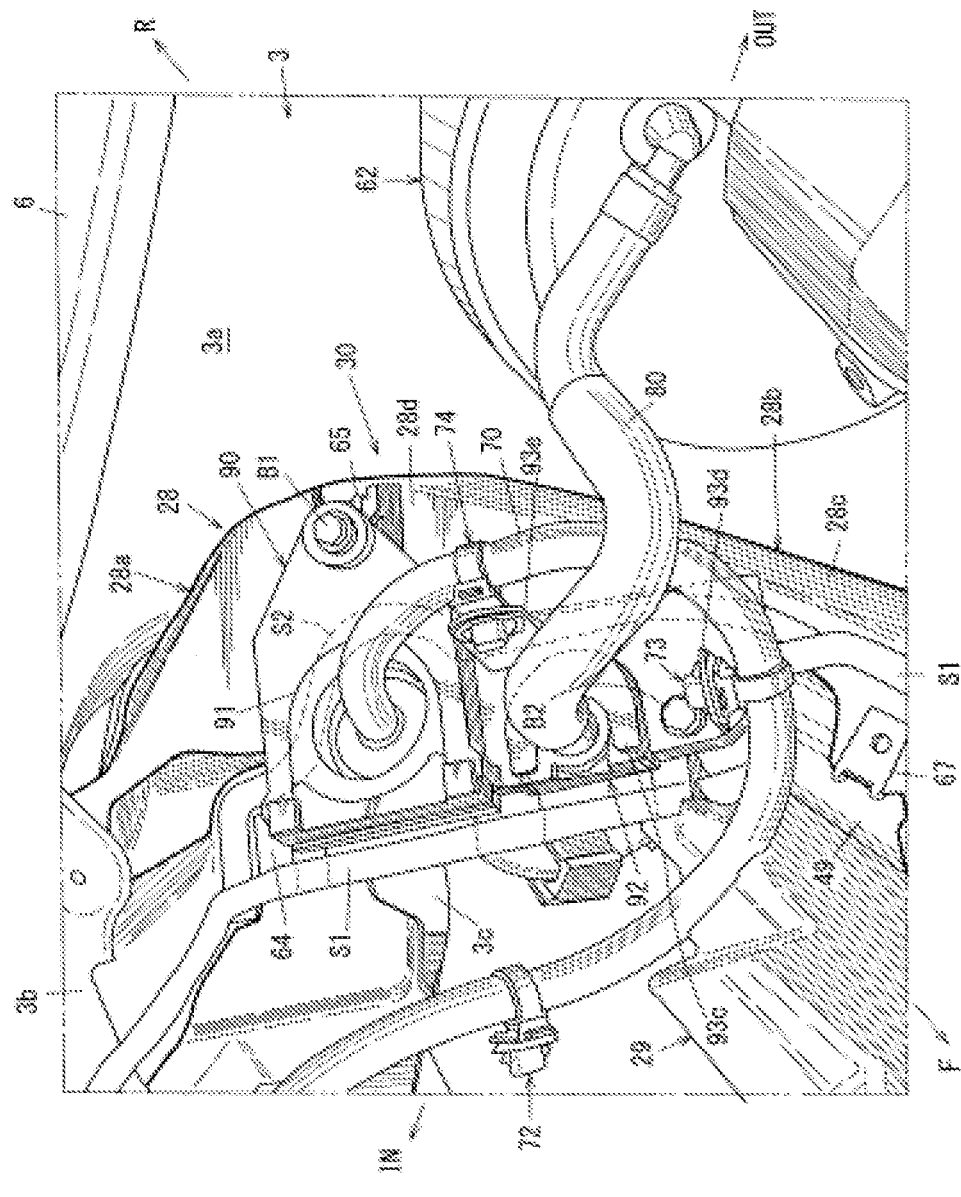
FIG. 12 is an upper region perspective view illustrating a through structure of the routing members with respect to a hard member.
Figure 13:
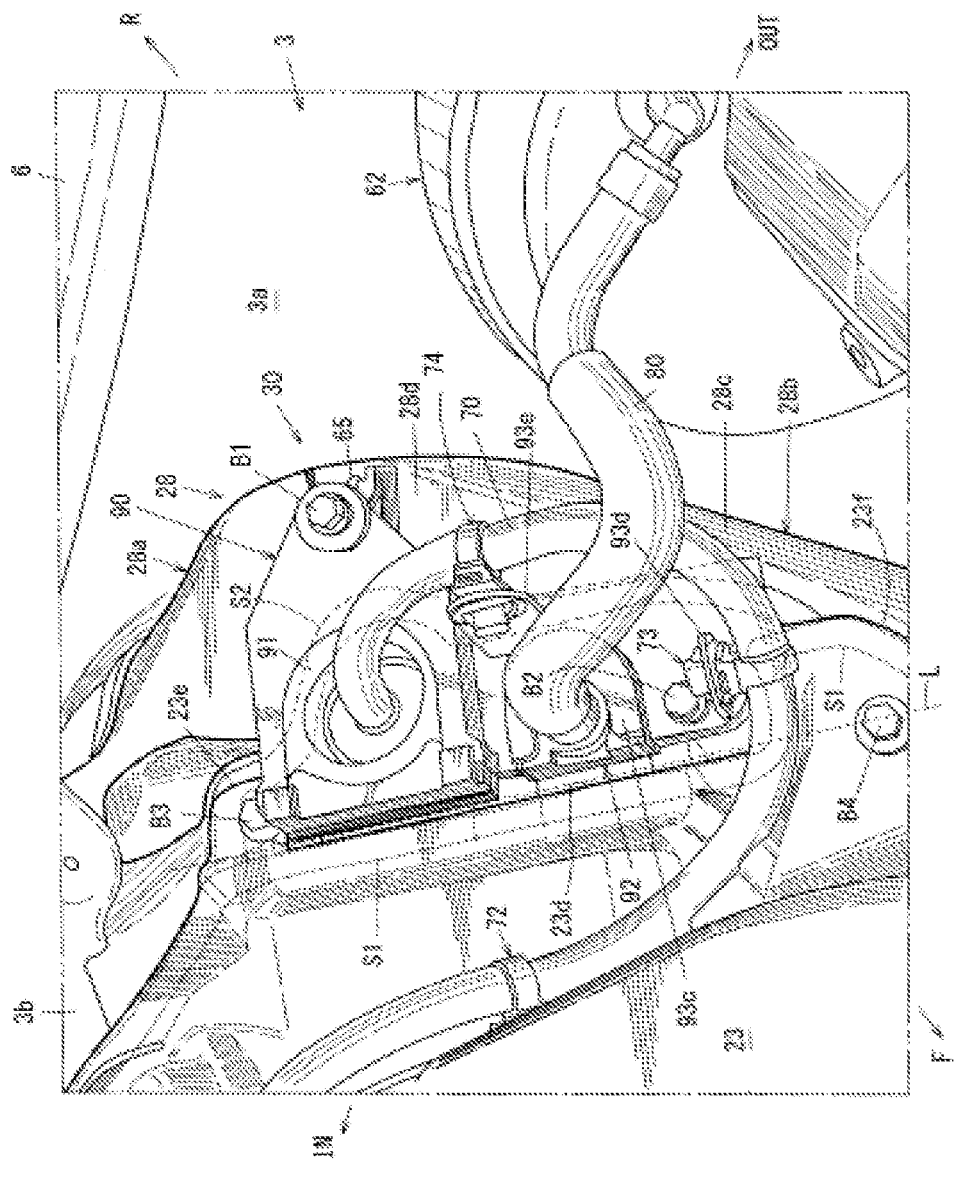
FIG. 13 is an upper region perspective view illustrating a state where the upper wall is mounted with respect to a state of FIG. 12.
Figure 14:
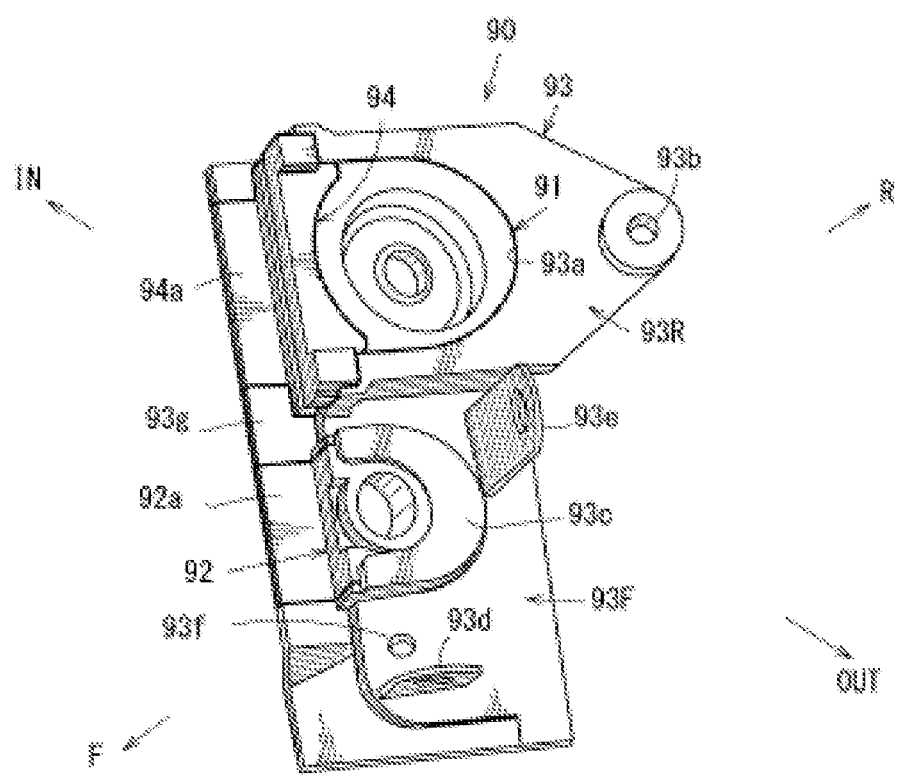
FIG. 14 is an upper region perspective view of the hard member including grommets.

FIG. 9 is an upper region perspective view of principal components, the upper region perspective view illustrating the engine room structure for a vehicle in a left hand drive vehicle, FIG. 10 is an upper region perspective view illustrating related structures among a side wall, an upper wall, and a second sealing member, and FIG. 11 is an upper region perspective view illustrating a through structure of routing members with respect to a through portion. Further, FIG. 12 is an upper region perspective view illustrating a through structure of the routing members with respect to a hard member, FIG. 13 is an upper region perspective view illustrating a state where the upper wall is mounted with respect to a state of FIG. 12, and FIG. 14 is an upper region perspective view of the hard member including grommets.

As illustrated in FIG. 9, a configuration is made such that vicinities of top portions of the pair of left and right front suspension tower portions 18 and 18 are coupled together by a tower bar 60 made of a metal pipe, inhibition of inward falling of the front suspension tower portions 18 is intended, and an improvement in operation stability is intended.

As illustrated in FIG. 9, the above tower bar 60 includes a horizontal portion 60a positioned at a center in the vehicle width direction, leg portions 60b and 60b extending obliquely downward from both of left and right ends of this horizontal portion 60a, and mounting seats 60c and 60c mounted on lower portions of the leg portions 60b.

In the above-described horizontal portion 60a, a flat portion which is a metal pipe processed to be flat is fixed to an upper surface of the forward protrusion 3b of the dash lower panel 3 by using mounting members such as bolts and nuts. The above-described mounting seat 60c is fixed to the vicinity of the top portion of the front suspension tower portion 18 by using mounting members such as bolts and nuts.

A vehicle illustrated in FIG. 9 is a left hand drive vehicle. As illustrated in FIG. 9, a battery 61 is arranged on the vehicle right side in a front region portion of the panel body 3a of the dash lower panel 3, and a booster (brake booster device) 62 of a brake is arranged on a vehicle left side.

As illustrated in FIG. 9, a harness 70 as one routing member is connected with the above-described battery 61, and a brake hose 80 (specifically, a vacuum hose) as the other routing member is connected with a negative pressure chamber in the booster 62 of the brake. Another end which is not illustrated of this brake hose 80 is connected with an intake system.

Here, both of the above-described harness 70 and brake hose 80 are the routing members, the flexibility of the harness 70 as one routing member is higher than the flexibility of the brake hose 80 as the other routing member. In other words, the brake hose 80 is configured with a molded hose less likely to be flexed than the harness 70.

FIG. 10 is an upper region perspective view illustrating a state where the above-described harness 70 and brake hose 80, a hard member described later, and the tower bar 60 are removed from FIG. 9. The above-described cover member 30 includes the rear-side left wall upper outer shell 28 (first member) as the side wall and the rear-side upper wall 23 (second member) as the upper wall.

As illustrated in FIG. 3, FIG. 4, and FIG. 10, in the above-described rear-side left wall upper outer shell 28, a rear periphery portion 28a extending in the vehicle width direction and a side periphery portion 28b extending forward of the vehicle from a left side end portion of this rear periphery portion 28a in the vehicle width direction are integrally formed into a general L shape in a vehicle planar view. Further, as illustrated in FIG. 10, the above-described rear periphery portion 28a and side periphery portion 28b includes a raised wall 28c and a folded portion 28d that is continuously folded from an upper end of this raised wall 28c to a front side and to a vehicle-width-direction inner side.

A through portion 63 through which the harness 70 and the brake hose 80 as plural routing members are caused to pass is formed between the rear-side left wall upper outer shell 28 and the rear-side upper wall 23 that configure the cover member 30. In this embodiment, the through portion 63 is formed between a corner section of a rear side left portion of the rear-side upper wall 23 and the rear-side left wall upper outer shell 28 corresponding to that.

That is, as illustrated in FIG. 10, in either one of the rear-side left wall upper outer shell 28 and the rear-side upper wall 23, in this embodiment, in the folded portion 28d of the rear-side left wall upper outer shell 28, two continuous notch-shaped portions 28e and 28f in arc recess shapes are formed adjacently to a partial dividing line L between those rear-side left wall upper outer shell 28 and rear-side upper wall 23.

Moreover, the through portion 63 for the above-described plural routing members (see the harness 70 and the brake hose 80) is formed with the notch-shaped portions 28e and 28f on one side (the rear-side left wall upper outer shell 28 side) and a linear end portion 23d on the other side (the rear-side upper wall 23 side).

As illustrated in FIG. 10, a mounting piece 23e of the rear-side upper wall 23 is integrally formed with a back end (specifically, an end portion in a rear region and on the vehicle-width-direction inner side) of the above end portion 23d, and a mounting piece 23f of the rear-side upper wall 23 is integrally formed with a front end (specifically, an end portion in a front region and on the vehicle-width-direction outer side) of the above end portion 23d.

As described above, the partial dividing line L between the rear-side left wall upper outer shell 28 as the first member and the rear-side upper wall 23 as the second member, which form the above-described cover member 30, is used, and the through portion 63 through which the plural routing members (see the harness 70 and the brake hose 80) are caused to pass is thereby formed by the above notch-shaped portions 28e and 28f without forming a substantial through hole.

As illustrated in FIG. 11, the harness 70 and the brake hose 80 as the above-described plural routing members are arranged, in a forming position of the through portion 63, side by side along the direction of the dividing line L (see FIG. 10) between the rear-side left wall upper outer shell 28 and the rear-side upper wall 23. Specifically, the harness 70 is routed in the position corresponding to one notch-shaped portion 28e, and the brake hose 80 is routed in the position corresponding to the other notch-shaped portion 28f. Hypothetically, in a case where both of the harness 70 and the brake hose 80 are arranged to correspond to only either one of the two notch-shaped portions 28e and 28f, the depth of a recess shape of the notch-shaped portion becomes deep; however, the above configuration is employed, and a configuration is thereby made such that the depths of the notch-shaped portions 28e and 28f can be formed to be shallow and facilitation of formability of the cover member (particularly, the rear-side left wall upper outer shell 28) is achieved.

Here, both of the routing members as the above-described harness 70 and brake hose 80 pass through the through portion 63 while being spaced apart at different distances from the respective notch-shaped portions 28e and 28f of the rear-side left wall upper outer shell 28 of the cover member 30. Moreover, the harness 70 as the routing member with higher flexibility is routed in a position in the rear-side left wall upper outer shell 28, the position being far from the notch-shaped portion 28e, and the brake hose 80 as the routing member with low flexibility is routed in a position close to the notch-shaped portion 28f.

Accordingly, a configuration is made such that interference with the rear-side left wall upper outer shell 28 due to shaking proneness of the harness 70 as the routing member with relatively high flexibility is inhibited and occurrence of abnormal noise due to contact of the harness 70 with the rear-side left wall upper outer shell 28 is inhibited.

In the left hand drive vehicle illustrated in FIG. 9, a connection terminal 71 for the battery 61 is provided in an end portion of the above-described harness 70 on the vehicle right side. The above harness 70 extends from a mounting section of the connection terminal 71 through the lower portion of the leg portion 60b on the vehicle right side of the tower bar 60 and extends in the vehicle width direction on an upper surface of an intermediate portion of the rear-side upper wall 23 in the front-rear direction. The harness 70 is routed so as to then go through the lower portion of the leg portion 60b on the vehicle left side of the tower bar 60 and pass through the through portion 63 corresponding to the notch-shaped portion 28e from an upper region toward a lower region.

Further, the brake hose 80 is mounted on a front face of the booster 62, the front face communicating with the negative pressure chamber of the booster 62, and is routed so as to start from the front face of the booster 62, go through an upper side of the harness 70, and pass through the through portion 63 corresponding to the notch-shaped portion 28f from an upper region toward a lower region. The other end which is not illustrated of this brake hose 80 is connected with the intake system.

As illustrated in FIG. 11, plural clips 72, 73, and 74 are mounted on the vehicle left side of the above-described harness 70. As illustrated in FIG. 11, a first sealing member S1 is provided between dividing portions of the rear-side left wall upper outer shell 28 as the first member and the rear-side upper wall 23 as the second member, which are illustrated in FIG. 10. This first sealing member S1 is adhered and fixed to not only a lower surface of the above end portion 23d corresponding to the dividing line L for the rear-side upper wall 23 but also a lower surface on a back end side of the rear-side upper wall 23. As illustrated in FIG. 11, plural clip nuts 64, 65, 66, and 67 are mounted on the above-described folded portion 28d of the rear-side left wall upper outer shell 28.

Further, as illustrated in FIG. 10 and FIG. 11, a second sealing member S2 is provided to an upper surface of the above-described folded portion 28d so as not to interfere with the above plural clip nuts 64 to 67. This second sealing member S2 is in advance adhered and fixed to a position corresponding to a portion between the mounting pieces 23e and 23f of the rear-side upper wall 23 on the upper surface of the folded portion 28d of the rear-side left wall upper outer shell 28 as the first member.

A protector 90 (see FIG. 12, FIG. 13, and FIG. 14) is provided as a hard member blocking the through portion 63 illustrated in FIG. 10, and the harness 70 and the brake hose 80 as the plural routing members are caused to pass through this single protector 90 via grommets 91 and 92. As illustrated in FIG. 14, the above-described protector 90 includes a base member 93 and a cover member 94. In the above-described base member 93, a rear side portion 93R and a front side portion 93F are integrally formed.

In the rear side portion 93R, an attachment portion 93a of the grommet 91 and a mounting portion 93b are formed. Further, in the front side portion 93F, an attachment portion 93c of the grommet 92, plural harness support pieces 93d and 93e, and a mounting portion 93f are formed.

One grommet 91 is a portion through which the harness 70 passes and which supports that, and a front portion of the grommet 91 attached to the attachment portion 93a is blocked by the cover member 94. The other grommet 92 is made of rubber, and this grommet 92 is a portion through which the brake hose 80 passes and which supports that, the grommet 92 is attached and fixed to the attachment portion 93c in the front side portion 93F of the base member 93.

As illustrated in FIG. 14, sealing seats 93g, 92a, and 94a are formed to be flush with each other in a front portion of the base member 93, a front portion of the grommet 92, and a front portion of the cover member 94. Bolts B1 and B2 (see FIG. 12) inserted in the mounting portions 93b and 93f illustrated in FIG. 14 are fastened to the clip nuts 65 and 66 (see FIG. 11), and the protector 90 is thereby mounted on a circumferential edge of the through portion in the cover member 30, specifically, on the folded portion 28d of the rear-side left wall upper outer shell 28 via the second sealing member S2. Bolts B3 and B4 illustrated in FIG. 13 are fastened to the clip nuts 64 and 67 (see FIG. 11) after mounting the protector 90, and the mounting pieces 23e and 23f of the rear-side upper wall 23 are thereby mounted on the folded portion 28d of the rear-side left wall upper outer shell 28. In this case, a configuration is made such that the first sealing member S1 for the dividing line L between the rear-side left wall upper outer shell 28 and the rear-side upper wall 23 is also used as a sealing member for the dividing line L for the protector 90. Further, the above-described first sealing member S1 abuts upper surfaces of the sealing seats 92a, 93g, and 94a illustrated in FIG. 14 and is retained by each of those sealing seats 92a, 93g, and 94a.

As described above, a configuration is made such that the above-described first sealing member S1 is used for both of sealing for the dividing line between the rear-side left wall upper outer shell 28 and the rear-side upper wall 23 and sealing for the dividing line L for the protector 90 and reduction of sealing members is intended. In particular, a configuration is made such that the mounting piece 23e of the rear-side upper wall 23 is fastened to the above folded portion 28d via the clip nut 64 (see FIG. 11) by using the bolt B3 (see FIG. 13) and surface pressures of the sealing members S1 and S2 are thereby secured.

Next, a description will be made about a mounting order of the above elements 28, 90, 23, 70, 80, and so forth. The rear-side left wall upper outer shell 28 is in advance mounted on the body, and the second sealing member S2 is in advance adhered and fixed to the upper surface of the folded portion 28d of the outer shell 28 (see FIG. 10).

With respect to the above-described folded portion 28d of the outer shell 28, the protector 90 in a state where the harness 70 is supported by one grommet 91 is mounted on the above folded portion 28d by using the bolts B1 and B2. Here, the second sealing member S2 is held between the upper surface of the folded portion 28d and a lower surface of the protector 90. Note that at this point, the brake hose 80 is not supported by the protector 90.

Because the other grommet 92 is in advance attached to the brake hose 80, the grommet 92 is next fitted into the attachment portion 93c of the protector 90, and the brake hose 80 is thereby mounted on the protector 90 (see FIG. 12).

Next, the rear-side upper wall 23 to whose lower surface the first sealing member S1 is in advance adhered is mounted on the folded portion 28d of the rear-side left wall upper outer shell 28 by using the bolts B3 and B4 (see FIG. 13). Note that as illustrated in FIG. 13, as for plural parts of the harness 70, the clip 72, the clip 73, and the clip 74 are respectively engaged with a predetermined portion of the rear-side upper wall 23, the harness support piece 93d, and the harness support piece 93e, and a routing posture of the harness 70 is thereby retained.

Figure 15:
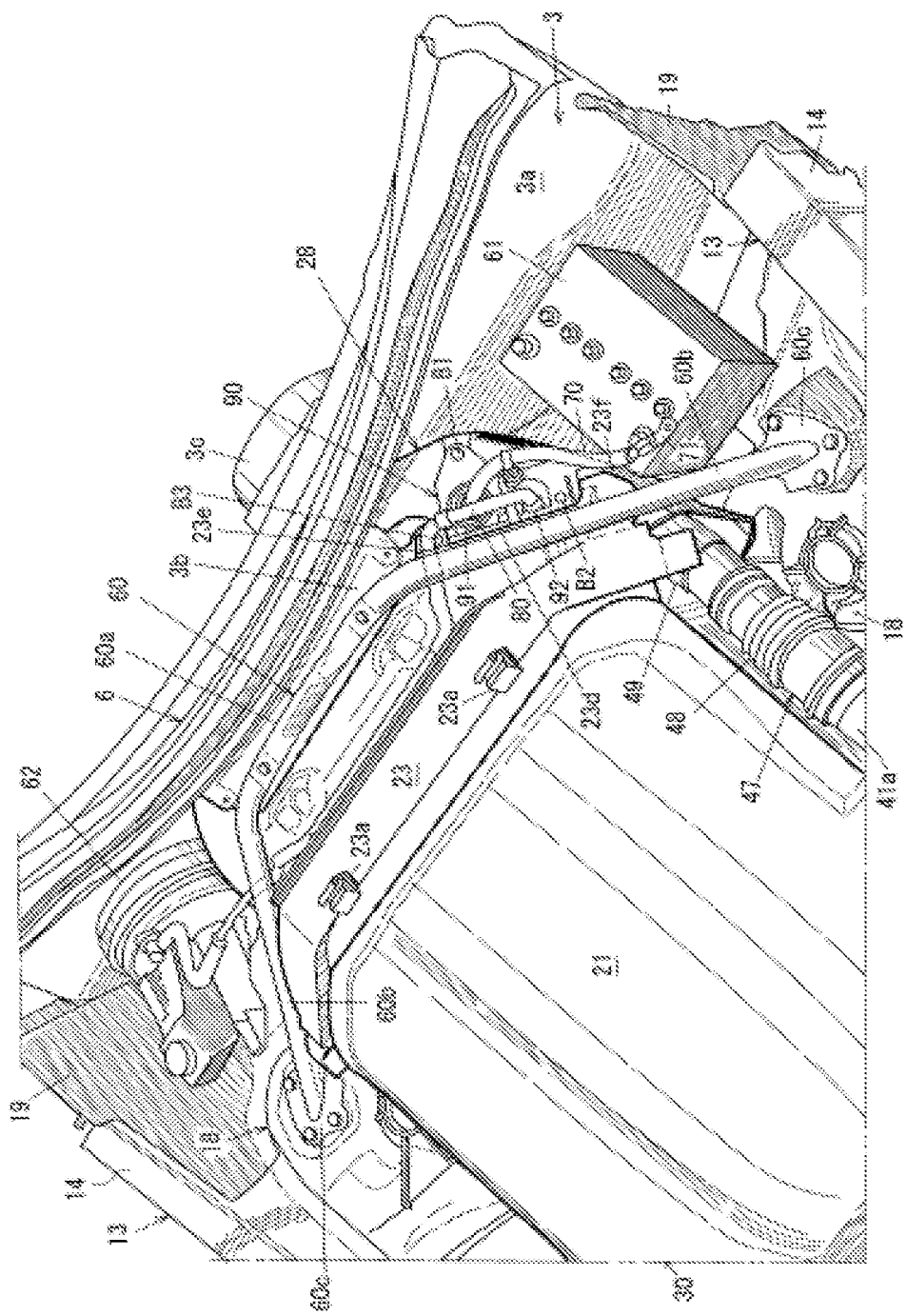
FIG. 15 is an upper region perspective view of principal components, the upper region perspective view illustrating the engine room structure for a vehicle in a right hand drive vehicle.

FIG. 15 is an upper region perspective view of principal components, the upper region perspective view illustrating the engine room structure for a vehicle in a right hand drive vehicle. Between the right hand drive vehicle illustrated in FIG. 15 and the left hand drive vehicle illustrated in FIG. 9, the disposing positions of the battery 61 and the booster 62 of the brake are switched in the left-right direction while corresponding to the arrangement structure of a steering wheel, a brake pedal, and so forth.

The protector 90 as the above-described hard member is common to the right hand drive vehicle illustrated in FIG. 15 and the left hand drive vehicle illustrated in FIG. 9, and the harness 70 and the brake hose 80 are configured to pass through the same positions of the above protector 90 in the up-down direction in the right hand drive vehicle (see FIG. 15) and the left hand drive vehicle (see FIG. 9). Accordingly, a configuration is made such that the common protector 90 is used for both of the vehicles which are the right hand drive vehicle and the left hand drive vehicle and the harness 70 as the routing member with high flexibility is inhibited from interfering with the side wall (rear-side left wall upper outer shell 28) as the first member.

In FIG. 15, the same reference characters are given to the same portions or portions providing the same functions as FIG. 9, and specific descriptions thereof are not made. Further, in the drawings, an arrow F indicates the vehicle front region, an arrow R indicates a vehicle rear region, an arrow IN indicates an inner region in the vehicle width direction, an arrow OUT indicates an outer region in the vehicle width direction, and an arrow UP indicates a vehicle upper region.

As described in detail in the foregoing, the engine room structure for a vehicle of the above embodiment is an engine room structure for a vehicle which includes the cover member 30 covering the upper portion of the engine 20 and in which the through portion 63 through which the plural routing members (see the harness 70 and the brake hose 80) are caused to pass is formed in the cover member 30. The cover member 30 is divided into at least the first member (rear-side left wall upper outer shell 28) and the second member (rear-side upper wall 23), the continuous notch-shaped portions 28e and 28f are formed along the partial dividing line L between the first member (rear-side left wall upper outer shell 28) and the second member (rear-side upper wall 23) in either one (the rear-side left wall upper outer shell 28 in this embodiment) of those members 28 and 23, and the through portion 63 for the plural routing members (the harness 70 and the brake hose 80) is formed with the notch-shaped portions 28e and 28f of the one member and the end portion 23d of the other member (see FIG. 3 and FIG. 10).

Note that the above-described first member corresponds to the member 28 having the rear periphery portion 28a, the side periphery portion 28b, and the folded portion 28d, and the second member corresponds to the rear-side upper wall 23.

In this configuration, the dividing line L between the first member (rear-side left wall upper outer shell 28) and the second member (rear-side upper wall 23) that form the cover member 30 is used, and the through portion 63 through which the plural routing members (the harness 70 and the brake hose 80) are caused to pass can thereby easily be formed by the notch-shaped portions 28e and 28f without forming a substantial through hole.

In one embodiment of this disclosure, the plural routing members (the harness 70 and the brake hose 80) are arranged side by side along the direction of the partial dividing line L between the first member (rear-side left wall upper outer shell 28) and the second member (rear-side upper wall 23) (see FIG. 11). In this configuration, the notch-shaped portions 28e and 28f can be formed to be shallow, and facilitation of formability of the cover member 30 (particularly, the rear-side left wall upper outer shell 28) can be achieved.

Furthermore, in one embodiment of this disclosure, the first sealing member S1 is provided between the dividing portions of the first member (rear-side left wall upper outer shell 28) and the second member (rear-side upper wall 23), the notch-shaped portions are formed in the first member, the plural routing members (the harness 70 and the brake hose 80) pass through a single hard member (protector 90) via the respective grommets 91 and 92, the hard member (protector 90) is mounted on the through portion 63 in the cover member 30 via the second sealing member S2 with respect to the notch-shaped portions of the first member, and the hard member (protector 90) is sealed in a portion of the dividing line L via the first sealing member S1 with respect to the second member (rear-side upper wall 23) (see FIG. 10 to FIG. 13).

In this configuration, because the first sealing member S1 is used for both of sealing between the dividing portions of the first member (rear-side left wall upper outer shell 28) and the second member (rear-side upper wall 23) and sealing for the portion of the dividing line L in the hard member (protector 90), reduction of sealing members can be intended.

Moreover, in one embodiment of this disclosure, the flexibility of one routing member (harness 70) of the plural routing members (the harness 70 and the brake hose 80) is higher than the flexibility of the other routing member (brake hose 80), the side wall of the cover member 30 is formed in either one of the first member and the second member, both of the routing members pass through the cover member 30 while being spaced apart at different distances from the side wall (rear-side left wall upper outer shell 28) of the cover member 30, and the routing member with higher flexibility (harness 70) is routed in a far position from the side wall (rear-side left wall upper outer shell 28) (see FIG. 11).

In this configuration, interference with the side wall (rear-side left wall upper outer shell 28) due to shaking proneness of the routing member with high flexibility (harness 70) can be inhibited, and occurrence of abnormal noise due to contact of the routing member (harness 70) with the side wall (rear-side left wall upper outer shell 28) can be inhibited.

In addition, in one embodiment of this disclosure, the one routing member is the harness 70 to be connected with the battery 61, the other routing member is the brake hose 80 to be connected with the booster 62 of the brake, disposing positions of the battery 61 and the booster 62 are switched in the left-right direction between a right hand drive vehicle (see FIG. 15) and a left hand drive vehicle (see FIG. 9), the hard member (protector 90) is common to the right hand drive vehicle and the left hand drive vehicle, and the harness 70 and the brake hose 80 pass through the same positions in the hard member (protector 90) in the right hand drive vehicle and the left hand drive vehicle (see FIG. 9 and FIG. 15).

In this configuration, the common hard member (protector 90) can be used for both of the vehicles which are the right hand drive vehicle and the left hand drive vehicle, and the harness 70 as the routing member with high flexibility can be inhibited from interfering with the side wall (rear-side left wall upper outer shell 28).

In the correspondence between the configurations of this disclosure and the above-described embodiment, the routing members of this disclosure correspond to the harness 70 and the brake hose 80 of the embodiment, and the same applies to the following. That is, the first member corresponds to the rear-side left wall upper outer shell 28 having the rear periphery portion 28a, the side periphery portion 28b, and the folded portion 28d, the second member corresponds to the rear-side upper wall 23, and the hard member corresponds to the protector 90; however, this disclosure is not limited only to the configurations of the above-described embodiment.

As described in the foregoing, the present disclosure is useful for an engine room structure for a vehicle which includes a cover member covering an upper portion of an engine and in which a through portion through which plural routing members are caused to pass is formed in the cover member.

What is claimed is:

1. An engine room structure for a vehicle, which comprises a cover member covering an upper portion of an engine and in which a through portion is formed in the cover member, plural routing members being caused to pass through the through portion, wherein
    the cover member is divided into at least a first member having a first edge and a second member having a second edge facing the first edge,
    the first edge includes continuous notch-shaped portions formed therein, such that the notch-shaped portions and the second edge define the through portion for the plural routing members, and
    the plural routing members are arranged side by side along a direction of a division between the first member and the second member.

2. The engine room structure for a vehicle according to claim 1, wherein
    a first sealing member is provided between the division of the first member and the second member, the notch-shaped portions are formed in the first member, the plural routing members pass through a single hard member via respective grommets,
    the hard member is mounted on the through portion in the cover member via a second sealing member with respect to the notch-shaped portions of the first member, and
    the hard member is sealed along the division via the first sealing member with respect to the second member.

3. The engine room structure for a vehicle according to claim 2, wherein
    flexibility of one routing member of the plural routing members is higher than flexibility of the other routing member, a side wall of the cover member is formed in either one of the first member and the second member, both of the routing members pass through the cover member while being spaced apart at different distances from the side wall of the cover member, and the routing member with higher flexibility is routed in a far position from the side wall.

4. The engine room structure for a vehicle according to claim 3, wherein the one routing member is a harness to be connected with a battery, the other routing member is a brake hose to be connected with a booster of a brake, disposing positions of the battery and the booster are switched in a left-right direction between a right hand drive vehicle and a left hand drive vehicle, the hard member is common to the right hand drive vehicle and the left hand drive vehicle, and the harness and the brake hose pass through the same positions in the hard member in the right hand drive vehicle and the left hand drive vehicle.

5. The engine room structure for a vehicle according to claim 1, wherein flexibility of one routing member of the plural routing members is higher than flexibility of the other routing member, a side wall of the cover member is formed in either one of the first member and the second member, both of the routing members pass through the cover member while being spaced apart at different distances from the side wall of the cover member, and the routing member with higher flexibility is routed in a far position from the side wall.

6. The engine room structure for a vehicle according to claim 5, wherein the one routing member is a harness to be connected with a battery, the other routing member is a brake hose to be connected with a booster of a brake, disposing positions of the battery and the booster are switched in a left-right direction between a right hand drive vehicle and a left hand drive vehicle, the plural routing members pass through a single hard member, the hard member is common to the right hand drive vehicle and the left hand drive vehicle, and the harness and the brake hose pass through the same positions in the hard member in the right hand drive vehicle and the left hand drive vehicle.

7. An engine room structure for a vehicle, which comprises a cover member covering an upper portion of an engine and in which a through portion is formed in the cover member, plural routing members being caused to pass through the through portion, wherein the cover member is divided into at least a first member having a first edge and a second member having a second edge, the first edge and the second edge each extending along a partial dividing line between the first member and the second member, one of the first edge and the second edge includes continuous notch-shaped portions therein, the through portion for the plural routing members is formed with the notch-shaped portions of the one of the first edge and the second edge, and an other of the first edge and the second edge that is absent the notch-shaped portions, and the plural routing members are arranged side by side along a direction of the partial dividing line between the first member and the second member.

8. The engine room structure for a vehicle according to claim 7, wherein a first sealing member is provided between the dividing line between the first member and the second member, the notch-shaped portions are formed in the first member, the plural routing members pass through a single hard member via respective grommets, the hard member is mounted on the through portion in the cover member via a second sealing member with respect to the notch-shaped portions of the first member, and the hard member is sealed along the dividing line via the first sealing member with respect to the second member.

9. The engine room structure for a vehicle according to claim 8, wherein flexibility of one routing member of the plural routing members is higher than flexibility of the other routing member, a side wall of the cover member is formed in either one of the first member and the second member, both of the routing members pass through the cover member while being spaced apart at different distances from the side wall of the cover member, and the routing member with higher flexibility is routed in a far position from the side wall.

10. The engine room structure for a vehicle according to claim 9, wherein the one routing member is a harness to be connected with a battery, the other routing member is a brake hose to be connected with a booster of a brake, disposing positions of the battery and the booster are switched in a left-right direction between a right hand drive vehicle and a left hand drive vehicle, the hard member is common to the right hand drive vehicle and the left hand drive vehicle, and the harness and the brake hose pass through the same positions in the hard member in the right hand drive vehicle and the left hand drive vehicle.

11. The engine room structure for a vehicle according to claim 7, wherein flexibility of one routing member of the plural routing members is higher than flexibility of the other routing member, a side wall of the cover member is formed in either one of the first member and the second member, both of the routing members pass through the cover member while being spaced apart at different distances from the side wall of the cover member, and the routing member with higher flexibility is routed in a far position from the side wall.

12. The engine room structure for a vehicle according to claim 11, wherein the one routing member is a harness to be connected with a battery, the other routing member is a brake hose to be connected with a booster of a brake, disposing positions of the battery and the booster are switched in a left-right direction between a right hand drive vehicle and a left hand drive vehicle, the plural routing members pass through a single hard member, the hard member is common to the right hand drive vehicle and the left hand drive vehicle, and the harness and the brake hose pass through the same positions in the hard member in the right hand drive vehicle and the left hand drive vehicle.

13. An engine room structure for a vehicle, which comprises a cover member covering an upper portion of an engine and in which a through portion is formed in the cover member, plural routing members being caused to pass through the through portion, wherein the cover member is divided into at least a first member having a first edge and a second member having a second edge facing the first edge, the first edge includes continuous notch-shaped portions formed therein, such that the notch-shaped portions and the second edge define the through portion for the plural routing members, flexibility of one routing member of the plural routing members is higher than flexibility of the other routing member, a side wall of the cover member is formed in either one of the first member and the second member, both of the routing members pass through the cover member while being spaced apart at different distances from the side wall of the cover member, and the routing member with higher flexibility is routed in a far position from the side wall.

\* \* \* \* \*